Figure 1:
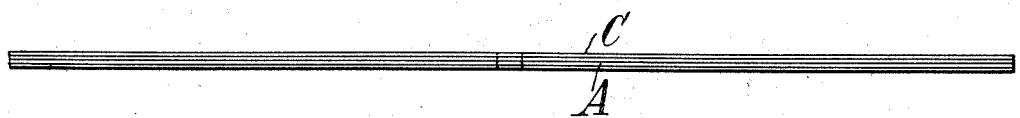

W. SANDERSON.
PROCESS OF MAKING RECORDS FOR PHONOGRAPHS, &c.
APPLICATION FILED JULY 14, 1906. RENEWED JUNE 18, 1909.

947,777.  Patented Jan. 25, 1910.

WITNESSES:
Fred White
René Ruine

INVENTOR:
William Sanderson,
By Attorneys,

UNITED STATES PATENT OFFICE.

WILLIAM SANDERSON, OF NEW YORK, N. Y.

PROCESS OF MAKING RECORDS FOR PHONOGRAPHS, &c.

947,777. Specification of Letters Patent. Patented Jan. 25, 1910.

Application filed July 14, 1906, Serial No. 326,201. Renewed June 18, 1909. Serial No. 502,969.

*To all whom it may concern:*

Be it known that I, WILLIAM SANDERSON, a citizen of the United States, residing in the borough of Brooklyn, in the county of Kings, city and State of New York, have invented certain new and useful Improvements in Processes of Making Records for Phonographs, &c., of which the following is a specification.

This invention relates to an improved process of making records for phonographs or the like.

This invention is especially directed to a process of making records in disk form, although it is capable of application to other shapes of records.

Disk records for phonographs or other sound reproducing devices are now commonly made of a plastic composition which is impressed with the sound record by a suitable matrix under the action of a hydraulic or other press. Such composition is usually formed in sheets, and during the operation of molding such sheets are placed upon a steam table which renders the composition sufficiently plastic to be worked. The mold, which contains the matrix, is then filled with a suitable quantity of the composition, the operator cutting off a sufficient number of pieces to form the finished record. The mold is then placed under the press and subjected to a pressure of from 60 to 80 tons, during which time the composition receives the impression of the matrix. This process is a comparatively slow and laborious one, and results in a record which is expensive and easily broken.

According to the preferred mode of practicing my invention I take a disk of iron or steel, or other hard tenacious non-hygroscopic material, and apply to such disk a layer or coating of plastic material which is sufficiently thick to receive the sound record, and while such material is in a plastic state press the sound record upon it by a suitable matrix. It is important that the base shall be constructed of a material which is hard and tenacious, so that it is not liable to be broken, either in transportation or use. It is also important that such base shall not be affected by the moisture in the atmosphere, as otherwise it will be liable to warp and thus render the record useless. It is also important that such base be limited in weight. Any material which conforms to these requirements may be used but I prefer sheet iron or steel of sufficient thickness to retain its flat or other proper form under the conditions of use.

The plastic material (by which term I mean any suitable material which is capable of being rendered plastic to receive the impression of the sound matrix, and which afterward hardens) may be of any of the compositions usually employed for this purpose. I prefer a mixture of barites 33 parts, terra alba 16¼ parts, clay 16¼ parts, flock 3 parts and shellac 31 parts.

In practicing the process in its preferred form, I first cut the sheet iron or steel into disks of suitable proportions, and thoroughly clean same, whereupon I apply to one side of the disk a layer of paper, asbestos or other suitable fibrous material, preferably by pasting or cementing the paper to the plate, using for this purpose any suitable adhesive, such as an ordinary casein solution. By this means any contraction or expansion of the plate has no substantial effect upon the plastic composition, and the latter is enabled to adhere more effectually than if it were applied directly to the metal itself. I may then apply the plastic composition to the disk in any suitable way as by heating the composition and applying it in its plastic form, but I prefer to coat the disk by two separate operations, by means of which I am enabled to more quickly and conveniently obtain the requisite thickness of coating. To this end I prepare a solution containing a suitable quantity of plastic composition, dissolved in a suitable medium which is adapted to dry quickly, such as alcohol. I preferably use for this 100 parts of plastic composition and 62 parts of alcohol, the shellac of the composition being first dissolved in the alcohol and the whole being intimately mixed, preferably by being ground together. This solution is applied to the paper, and is allowed to dry thereon, this being quickly accomplished by the evaporation of the alcohol. The disks are then taken to the molding room and a further quantity of plastic composition in a dry, powdered or granulated state is applied thereto, preferably by sprinkling it thereon by a sieve or other suitable device. The disks are then placed upon a steam table and the first coating and the powdered composition are softened so that they become substantially homogeneous, and the operator then places the disk in the mold with its coated side downward and then places the mold in the press. During the pressing operation the mold is cooled so that the composition hardens after receiving the impression of the sound matrix. After the pressing operation the mold is kept closed until the record is cool. If desired instead of sprinkling the composition upon the disk before the latter is heated preliminary to the molding operation, it may be sprinkled thereon after heating, when the first coating is in a softened state, sufficient heat being afterward applied to soften the entire composition.

Figure 2:
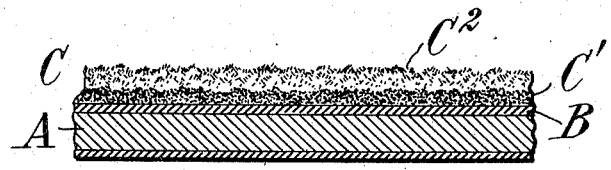
Figure 3:

In the drawings, Figure 1 is an elevation of a disk made according to my invention in its preferred form, Fig. 2 is a section thereof prior to the molding operation, the several layers being exaggerated for clearness, and Fig. 3 is a similar view after the molding operation.

In the drawings A is the base, B is the layer or coating of fibrous material, and C is the layer or coating of plastic material. In Fig. 2 C' is the coating of liquid composition and $C^2$ the layer of powdered composition.

The process provided by my invention has several extremely important advantages over those of the prior art. By forming the base of a hard tenacious material of the suitable character, I am enabled to restrict the quantity of plastic material necessarily used to the minimum. This renders it feasible to use the plastic material in the form either of a powder or a liquid solution. Such solution or powder can be easily applied by unskilled labor. I am also enabled to effect an important economy of time during the molding operation. By my invention it is only necessary for the operator to have a number of disks upon the steam table kept at a suitable degree of heat, and to place them in the mold as rapidly as the action of the press permits. This may be easily and rapidly done by unskilled labor, whereas under the methods now commonly practiced it takes considerable time to cut the necessary material for each mold from the sheet and a considerable amount of skill to measure the precise quantity of material which is required for each mold. Each of the disks prepared according to the present process contains substantially the correct thickness of plastic material and the operator has nothing further to do than to place them within the molds with the layer of plastic material downward, close the mold and at once place it in the press. Furthermore there is no danger of breaking or cracking the record either during the molding operation or in removing the record from the mold. By my invention I am also enabled to provide a disk having a sound record on each side, which may be easily accomplished by coating the disk on both sides with the plastic composition and impressing the sound records thereon by the use of two matrices in a single molding operation. This is a difficult if not impossible operation with prior processes of manufacture.

The new record provided by my invention has numerous advantages over those heretofore made, including a greater degree of durability, and economy of manufacture. I do not herein claim such record, as this forms the subject matter of another application filed by me July 14, 1909, Serial No. 326,202.

Although I have described in detail the preferred process of practicing my invention, I do not wish to be limited thereto as various changes may be made therein without departing from the spirit of my invention.

An important feature of my invention is the fact that I am enabled to produce a record with an extremely thin coating of composition, and this aids materially in cheapening the cost of the record.

What I claim is:—

The process of making records for phonographs or the like which consists in applying a layer of fibrous material to a metal base and then forming a layer or coating of plastic composition on said fibrous material and impressing a sound record on said layer while in its plastic state.

In witness whereof, I have hereunto signed my name in the presence of two subscribing witnesses.

WILLIAM SANDERSON.

Witnesses:
EUGENE V. MYERS,
THEODORE T. SNELL.